US012763627B2

(12) United States Patent
Park et al.

(10) Patent No.: US 12,763,627 B2
(45) Date of Patent: Oct. 13, 2026

(54) TOROIDAL MOTOR

(71) Applicant: Hanon Systems, Daejeon (KR)

(72) Inventors: Gunwoong Park, Daejeon (KR); Min Gyu Park, Daejeon (KR); Chi Yong Park, Daejeon (KR); Yeol Woo Sung, Daejeon (KR); Jong Sung Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 265 days.

(21) Appl. No.: 18/284,355

(22) PCT Filed: Jun. 13, 2022

(86) PCT No.: PCT/KR2022/008290

§ 371 (c)(1),
(2) Date: Apr. 8, 2024

(87) PCT Pub. No.: WO2023/008734

PCT Pub. Date: Feb. 2, 2023

(65) Prior Publication Data

US 2024/0266900 A1 Aug. 8, 2024

(30) Foreign Application Priority Data

Jul. 29, 2021 (KR) ........................ 10-2021-0099698

(51) Int. Cl.
*H02K 3/52* (2006.01)

(52) U.S. Cl.
CPC ......... *H02K 3/525* (2013.01); *H02K 2203/09* (2013.01)

(58) Field of Classification Search
CPC ...... H02K 3/525; H02K 2203/09; H02K 1/14; H02K 3/18; H02K 3/28; H02K 1/145;
(Continued)

(56) References Cited

U.S. PATENT DOCUMENTS

2002/0125775 A1* 9/2002 Detela .................... H02K 7/088 310/162
2013/0249343 A1* 9/2013 Hunstable ............. H02K 31/02 310/177
2018/0041083 A1* 2/2018 Centner .................. H02K 3/12

FOREIGN PATENT DOCUMENTS

CN 107078582 A 8/2017
JP 2004519990 A 7/2004
(Continued)

OTHER PUBLICATIONS

English translation of JP-2008178165-A (Year: 2008).*
(Continued)

*Primary Examiner* — Tulsidas C Patel
*Assistant Examiner* — Joshua Kiel M Rodriguez
(74) *Attorney, Agent, or Firm* — NORTON ROSE FULBRIGHT US LLP

(57) ABSTRACT

The present invention relates to a toroidal motor in which a coil is wound around a yoke, and more particularly, to a toroidal motor in which a process of winding a coil starts from an inside of a yoke to ensure a sufficient insulation distance from a rotor side housing, a busbar assembly is disposed on an upper portion of the yoke to make it easy to connect a busbar and the coil, and the busbar is configured so as not to cover a slot, through which cooling air flows, to ensure cooling performance and simplify an entire structure of the motor.

9 Claims, 7 Drawing Sheets

(58) Field of Classification Search
CPC ............ H02K 1/146; H02K 1/16; H02K 3/12; H02K 3/505; H02K 5/225; H02K 2213/03; H02K 3/52
See application file for complete search history.

(56) References Cited

FOREIGN PATENT DOCUMENTS

| | | | |
|---|---|---|---|
| JP | 2006101656 | A | 4/2006 |
| JP | 2008178165 | A | 7/2008 |
| JP | 2011234553 | A | 11/2011 |
| JP | 2014079090 | A | 5/2014 |
| JP | 2014110707 | A | 6/2014 |
| KR | 20140142295 | A | 12/2014 |

OTHER PUBLICATIONS

English translation of JP-2014110707-A (Year: 2014).*
English translation of JP-2014079090-A (Year: 2014).*
English translation of JP-2011234553-A (Year: 2011).*
International Search Report issued in PCT/KR2022/008290 on Sep. 29, 2022.

* cited by examiner

TOROIDAL MOTOR

CROSS REFERENCE TO RELATED APPLICATIONS

This patent application is a national phase under 35 U.S.C. § 371 of International Patent Application No. PCT/KR2022/008290 filed Jun. 13, 2022, which claims the benefit of priority from Korean Patent Application No. 10-2021-0099698 filed Jul. 29, 2021, each of which is hereby incorporated herein by reference in its entirety for all purposes.

TECHNICAL FIELD

The present invention relates to a toroidal motor in which a coil is wound around a yoke, and more particularly, to a toroidal motor in which a process of winding a coil starts from an inside of a yoke to ensure a sufficient insulation distance from a rotor side housing, a busbar assembly is disposed on an upper portion of the yoke to make it easy to connect a busbar and the coil, and the busbar is configured so as not to cover a slot, through which cooling air flows, to ensure cooling performance and simplify an entire structure of the motor.

BACKGROUND ART

An electric motor is made by winding a coil around the stator and induces electromagnetism by means of electricity supplied to the coil. The electric motors are classified into a concentrated winding-type motor, a distributed winding-type motor, and a toroidal motor depending on methods of winding the coils.

The concentrated winding-type motor is made by winding a coil around teeth of a stator and has a single slot having a single pole and a single phase. The concentrated winding-type motor is advantageous in easily winding the coil and providing excellent mass production. However, because the coil is concentratedly wound at a particular portion, magnetic flux (electromagnetic force) is also concentrated on the particular portion, which degrades efficiency and causes a high loss of heat generation.

The distributed winding-type motor is made by distributing and winding a single phase coil in two or more slots. The distributed winding-type motor has a more segmentalized magnetic flux distribution than the concentrated winding-type electric motor and thus has excellent efficiency and a low loss of heat generation. However, because of a narrow slot inlet, it is difficult to wind the coil and connect the coil, which degrades mass production.

The toroidal motor has been developed to solve the problems. The toroidal motor is made by winding a coil around a circular yoke of a stator. The toroidal motor is excellent in mass production because it is easier to wind the coil than the distributed winding-type motor. The toroidal motor has a segmentalized magnetic flux distribution and thus has excellent efficiency or a low loss of heat generation in comparison with the concentrated winding-type motor.

FIG. 1 is a cross-sectional view illustrating a toroidal motor 2 in the related art. As illustrated, the toroidal motor 2 includes: a cylindrical housing 3; a stator 7 including a cylindrical yoke portion 4, tooth portions 5 protrude from an inner surface of the yoke portion 4 and spaced apart from one another at predetermined distances in an outer circumferential direction, and housing support portions 6 protruding from the outer circumferential surface of the yoke portion 4 and spaced apart from one another at predetermined distances in the outer circumferential direction; and a coil 8 wound around the yoke portion 4.

In the case of the toroidal motor, a connection process for supplying electricity to the coil needs to be performed after the winding process is completed. To this end, a busbar may be used. In this case, the busbar interferes with a housing or a rotary body in accordance with a position of the busbar. In order to prevent the interference, it is necessary to unnecessarily increase packaging of the entire motor and extend a tip and a distal end portion of the coil to the busbar in accordance with the position of the busbar, which causes an inconvenience and increases process time and facility complexity. In addition, the tip of the coil, a rear end of the coil, and a portion of the coil connected to the busbar are not easily exposed, which makes it difficult to assemble the busbar and press and weld the busbar and the coil after assembling the busbar and coil.

Japanese Patent Application Laid-Open No. 2004-286687 discloses a toroidal motor in which a busbar is positioned directly on a yoke portion, and a tip and a distal end portion of a coil are connected directly to the busbar exposed to surfaces of teeth, such that packaging may be simplified.

However, the toroidal motor has problems in which the busbar cannot be configured only by a width of the yoke portion because the busbar needs to have a sufficiently large cross-sectional area in a motor having a large electric current capacity, there is a limitation in obtaining sufficient insulation performance in a motor having a high voltage because a distance between the busbar and the coil is very short. Further, the toroidal motor has a problem in which the coil is unnecessarily wound because of an insulator of the busbar positioned on the surface of the yoke portion, which unnecessarily increases a total length of the coil and increases a loss of the coil caused by an increase in resistance of the coil.

Document of Related Art

Japanese Patent Application Laid-Open No. 2006-101656 (published on Apr. 13, 2006)

DISCLOSURE

Technical Problem

The present invention has been made in an effort to solve the above-mentioned problem, and an object of the present invention is to provide a toroidal motor in which a process of winding a coil starts from an inside of a yoke to ensure a sufficient insulation distance from a rotor side housing, a busbar assembly is disposed on an upper portion of the yoke to make it easy to connect a busbar and the coil, and the busbar is configured so as not to cover a slot, through which cooling air flows, to ensure cooling performance and simplify an entire structure of the motor.

Technical Solution

An embodiment of the present invention provides a toroidal motor including: an annular yoke; a plurality of teeth protruding radially from the yoke and spaced apart from one another in a circumferential direction of the yoke; and coils disposed between the two adjacent teeth among the plurality of teeth and wound around the yoke, in which a tip portion of each of the coils from which a process of winding the coil starts is positioned radially inside the yoke.

A distal end portion of each of the coils at which the process of winding the coil ends may be positioned radially outside the yoke.

The tip portion and the distal end portion of each of the coils may extend toward one side of the yoke based on an axial direction.

The tip portion of each of the coils may be positioned adjacent to a radially inner surface of the yoke, and the distal end portion of each of the coils may be positioned to be spaced apart from a radially outer surface of the yoke.

The tip portion of each of the coils may be positioned adjacent to any one of the two teeth positioned at two opposite sides of each of the coils.

The distal end portion of each of the coils may be positioned adjacent to the other of the two teeth.

The toroidal motor may further include: a busbar assembly electrically connected to the coils, in which the busbar assembly includes: an annular assembly body; and a plurality of busbars protruding radially from the assembly body.

A radial width of the assembly body may be equal to or smaller than a radial width of the yoke.

The assembly body and the yoke may be disposed side by side in an axial direction.

The plurality of busbars may each be provided in the form of a hook and coupled to any one of the tip portion and a distal end portion of each of the coils.

Some of the plurality of busbars may protrude radially inward from the assembly body, and the remaining busbars may protrude radially outward from the assembly body.

The busbar assembly may further include a connection terminal connected to an external power source, and the connection terminal protrudes radially from the assembly body.

A through-hole may be formed in a central portion of the connection terminal and formed through the connection terminal.

A protruding portion may be provided between the two adjacent coils among the coils and further protrude axially than a yoke portion around which each of the coils is wound.

A lower surface of the assembly body, which is a surface facing the yoke, may be flat.

Advantageous Effects

According to the present invention, the process of winding the coil may start from the inside of the yoke to ensure a sufficient insulation distance from the rotor side housing, the busbar assembly may be disposed on the upper portion of the yoke to make it easy to connect the busbar and the coil, and the busbar may be configured so as not to cover the slot, through which cooling air flows, to ensure cooling performance and simplify the entire structure of the motor.

MODE FOR INVENTION

Hereinafter, the present invention will be described with reference to the accompanying drawings.

Figure 1:
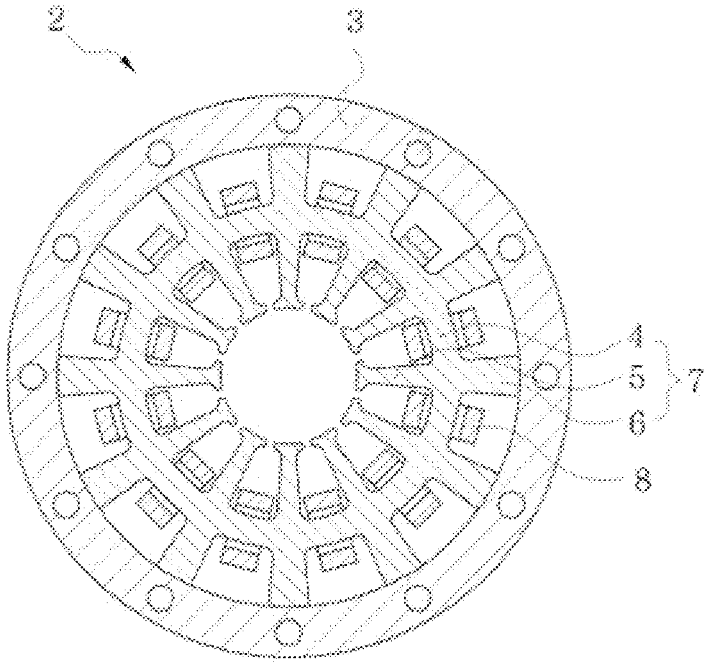
FIG. 1 (PRIOR ART)
FIG. 1 is a cross-sectional view of a toroidal motor in the related art.
Figure 2:
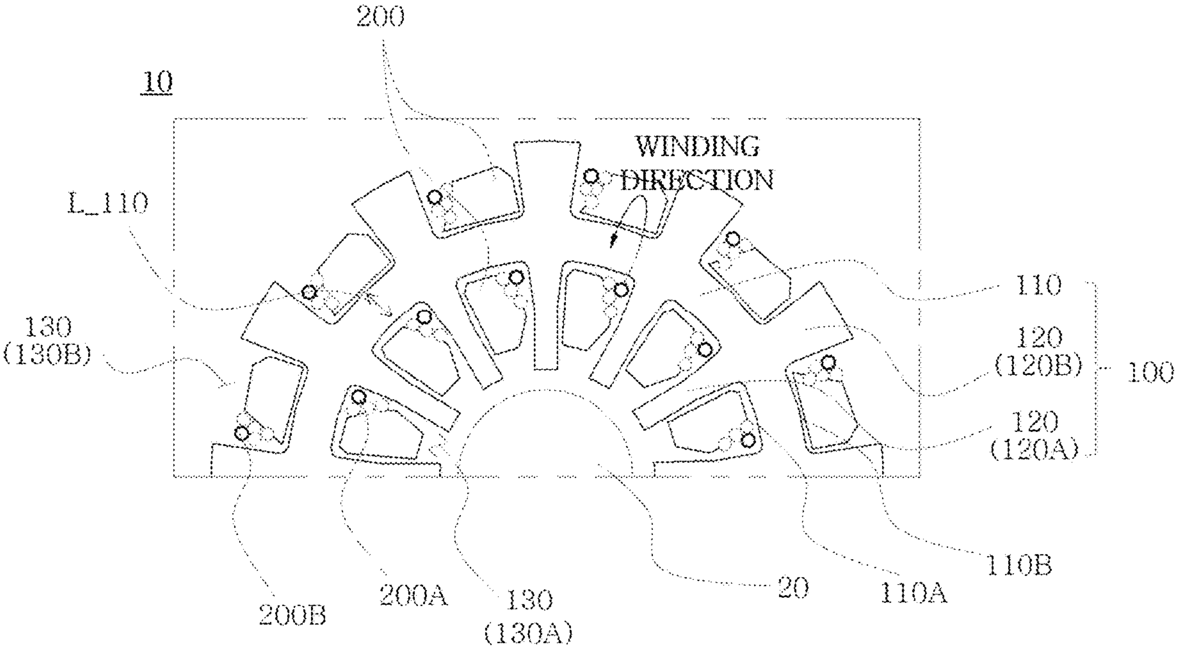
FIG. 2 is a view illustrating a cross-section of a toroidal motor according to an example of the present invention.

FIG. 2 is a view illustrating a cross-section of a toroidal motor according to an example of the present invention. As illustrated, a motor 10 of the present invention may broadly include a stator 100 including a yoke 110 and teeth 120, coils 200, and a rotor 20. Because the rotor 20 is a part disposed inside the stator 100 and configured to rotate in the motor, a detailed description thereof will be omitted.

The yoke 110 of the stator 100 has an annular shape. More specifically, the yoke 110 may have a cylindrical shape having a predetermined width in a radial direction, and a predetermined thickness in an axial direction.

The plurality of teeth 120 of the stator 100 protrudes from the yoke 110 in the radial direction and spaced apart from one another in a circumferential direction of the yoke 110. As illustrated, the teeth 120 include inner teeth 120A and outer teeth 120B respectively protruding radially inward and outward from points on the yoke 110. The inner teeth 120A and the outer teeth 120B are structured to extending through the yoke 110 positioned between the inner teeth 120A and the outer teeth 120B. A slot 130, which corresponds to an empty space, may be formed between the two teeth 120 that are adjacent to each other in the circumferential direction and spaced apart from each other, thereby providing spaces in which the coils 200 are accommodated. The slot 130 may include an inner slot 130A positioned radially inside the yoke 110 based on the yoke 110, and an outer slot 130B positioned radially outside the yoke 110. For example, the motor 10 of the present invention may have a total of twelve slots. Hereinafter, in the present invention, 'radially inward' and 'radially outward' are respectively simply referred to as 'inward' and 'outward'.

The coils 200 may be wound around the yoke 110 between the two adjacent teeth 120 among the plurality of teeth 120. That is, the motor 10 of the present invention is the toroidal motor in which the coil is wound around the yoke. The coil 200 may each be wound around the yoke 110 and positioned in the slot 130.

In this case, in the present invention, a tip portion 200A of the coil 200, from which the process of winding the coil 200 starts, may be positioned inside the yoke 110. In other words, in the present invention, the process of winding the coil 200 may start from the radially inside of the yoke 110. Therefore, the tip portion 200A of the coil may be positioned inside the yoke 110, i.e., positioned in the inner slot 130A.

Further, a distal end portion 200B of the coil 200, at which the process of winding the coil 200 ends, may be positioned outside the yoke 110. In other words, in the present invention, the process of winding the coil 200 may start from the radially inside of the yoke 110, the coil 200 may be wound in one direction, and then the process of winding the coil 200 may end at the radially outside of the yoke 110. Therefore, the distal end portion 200B of the coil may be positioned outside the yoke 110, i.e., positioned in the outer slot 130B.

As described above, in the present invention, because the process of winding the coil 200 starts from the inside of the yoke 110, the tip portion 200A of the coil may be positioned adjacent to a radially inner surface 110A of the yoke 110. Because the process of winding the coil 200 ends at the outside of the yoke 110, the distal end portion 200B of the coil may be positioned to be spaced apart from a radially outer surface 110B of the yoke 110.

In addition, with reference back to FIG. 2, the tip portion 200A of the coil may be positioned adjacent to any one of the two teeth 120 positioned at two opposite sides of the coil, and the distal end portion 200B of the coil may be positioned adjacent to the other of the two teeth 120. That is, with reference to the drawings, the tip portion 200A of the coil may be positioned adjacent to the tooth 120 positioned at the right side between the two teeth 120 at the two opposite sides that define the slot 130. The distal end portion 200B of the coil may be positioned adjacent to the tooth 120 positioned at the left side between the two teeth 120. Because the tip portion and the distal end portion of the coil are disposed at different positions in the slot as described above, the tip portion and the distal end portion of the coil may be maximally spaced apart from each other, which is advantageous in ensuring the space at the time of connecting the busbar and the coil.

Figure 3:
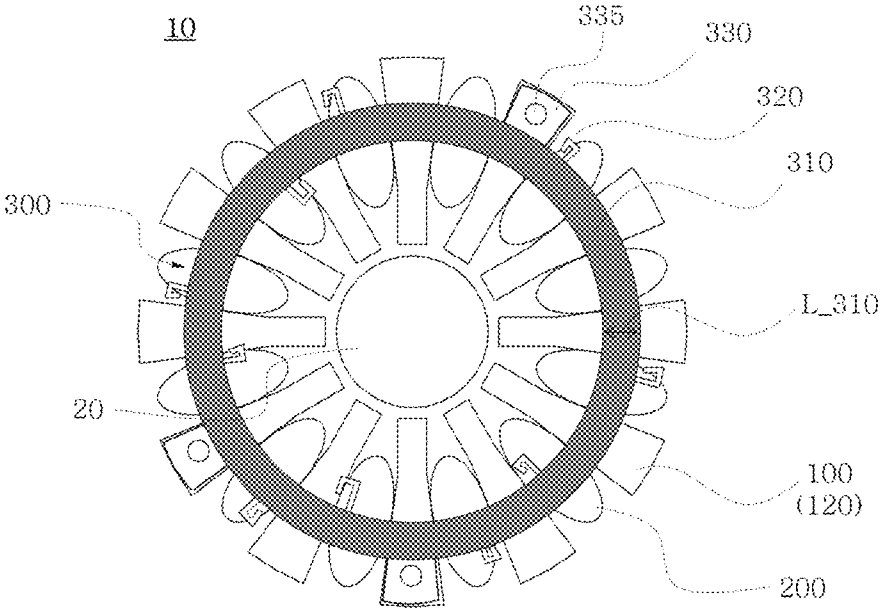
FIG. 3 is a view illustrating a state in which a busbar assembly and a stator are coupled when viewed from above.
Figure 4:
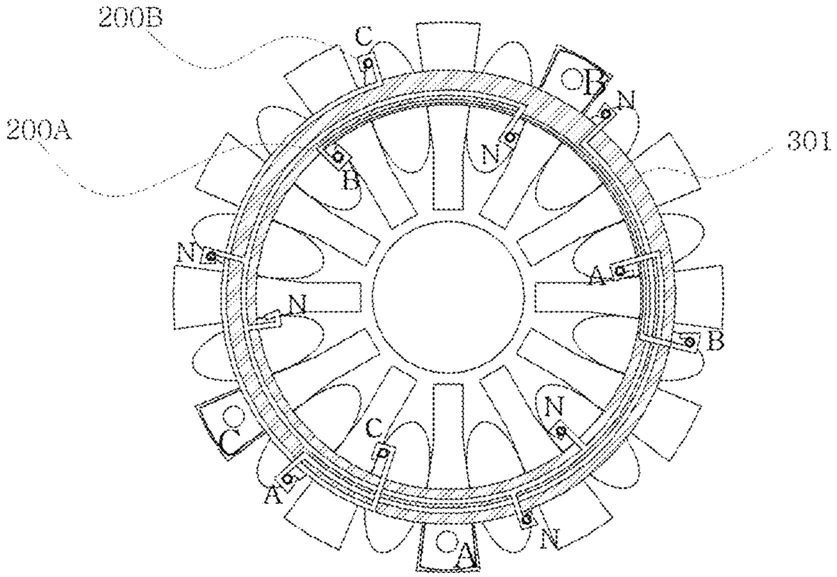
FIG. 4 is a transparent view illustrating the busbar assembly in FIG. 3.

Hereinafter, the busbar assembly according to the example of the present invention will be described. FIG. 3 is a view illustrating a state in which the busbar assembly and the stator are coupled when viewed from above, and FIG. 4 is a transparent view of the busbar assembly in FIG. 3. As illustrated, the motor 10 of the present invention may further include a busbar assembly 300.

The busbar assembly 300 is configured to be electrically connected to the coils 200 to supply electricity to the coils 200. The busbar assembly 300 may broadly include an assembly body 310 and a plurality of busbars 320.

The assembly body 310 has an annular. Like the yoke 110, the assembly body 310 may have a cylindrical shape having a predetermined width in the radial direction, and a predetermined thickness in the axial direction. Power lines 301 may be installed in the assembly body 310. For example, as illustrated, the power lines may be provided as four three-phase lines, i.e., A, B, C, and N lines. In this case, one or more connection terminals 330, which are connected to an external power source, may be respectively provided on the A, B, and C lines. The connection terminal 330 may protrude radially outward from the busbar body 310. Further, a through-hole 335 may be formed in a central portion of each of the connection terminals 330 so that a nut may pass through the through-hole 335, such that the connection terminal 330 and an external terminal may be easily connected to each other by means of the nut. The connection terminal 330 may serve to facilitate the connection between the external terminals and facilitate the connection between the assembly body and the stator. The connection terminal may serve as a bracket for connecting the assembly body, the stator, and the external terminal.

In this case, a radial width L_310 of the assembly body 310 may be equal to or smaller than a radial width L_110 of the yoke 110. Further, the assembly body 310 and the yoke 110 may be disposed side by side in the axial direction. For example, with reference to FIG. 3, the assembly body 310 and the yoke 110 may be disposed on concentric circles. The assembly body 310 and the yoke 110 are disposed side by side in the axial direction, such that the assembly body 310 may be disposed on an upper portion or an upper surface of the yoke 110 when viewed based on the drawing. That is, the assembly body 310 has substantially the same size and shape as the yoke 110 and is disposed on the upper portion of the yoke 110, such that the assembly body 310 may be coupled to the yoke 110 side by side.

Because the assembly body 310 is disposed on the upper portion of the yoke 110 side by side as described above, the assembly body does not cover inner and outer cooling flow paths for cooling the coil, i.e., does not cover the remaining portion of the slot, except for a portion occupied by the coil. Therefore, the flow of cooling air flowing in the empty space of the slot may not be hindered, thereby improving efficiency in cooling the coil or the like in the motor by using cooling air.

The plurality of busbars 320 may radially protrude from the assembly body 310. As illustrated, the busbar 320 may be configured to be connected to any one of the power lines 301. Some of the plurality of busbars 320 may protrude radially inward from the assembly body 310, and the remaining busbars 320 may protrude radially outward from the assembly body 310. More specifically, with reference to the example in FIG. 4, in the case of the A, B, and C lines, the busbars 320 may be respectively provided at two opposite ends of each of the A, B, and C lines. In this case, when the busbar 320 at one end protrudes to the inside of the body, the busbar 320 at the other end may protrude to the outside of the body. In the case of the N line, the busbars may be provided not only at two opposite ends of the N line but also at a middle portion. In this case, protruding directions of the busbars 320 provided on the N line may be configured such that inward and outward directions are alternately disposed along the N line.

Further, as illustrated in FIGS. 3 and 4, the busbar 320 may be provided in the form of a hook and coupled to any one of the tip portion 200A and the distal end portion 200B of the coil 200. More specifically, the busbar 320 may have an L-shaped hook structure. The hook and the coil may be fastened to each other by positioning the tip portion 200A or the rear end portion 200B of the coil between the bent portions of the hook and then pressing the hook or welding the hook and the coil.

Figure 5:
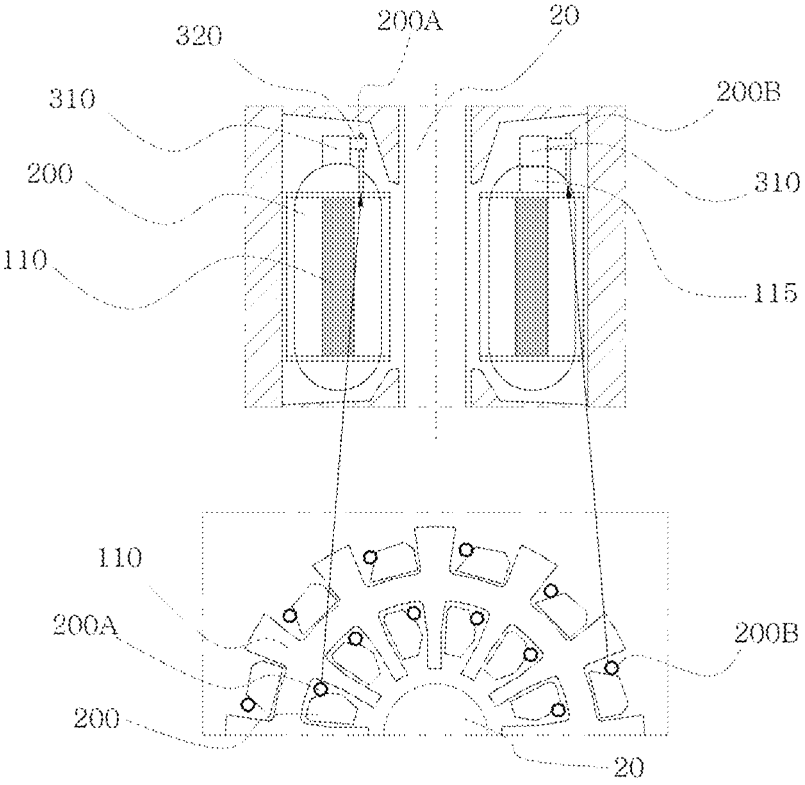
FIG. 5 is a view schematically illustrating a lateral cross-section of the motor in FIG. 2.

FIG. 5 is a view schematically illustrating a lateral cross-section of the motor in FIG. 2. The left part of the upper drawing in FIG. 5 indicates a cross-section including the tip portion of the coil, and the right part of the upper drawing in FIG. 5 indicates a cross-section including the distal end portion of the coil. As illustrated, in the motor of the present invention, the tip portion 200A of the coil may be positioned inside the yoke 110 so as to be adjacent to the radially inner surface of the yoke 110, and the distal end portion 200B of the coil may be disposed outside the yoke 110 so as to be adjacent to the radially outer surface of the yoke 110.

Figure 6:
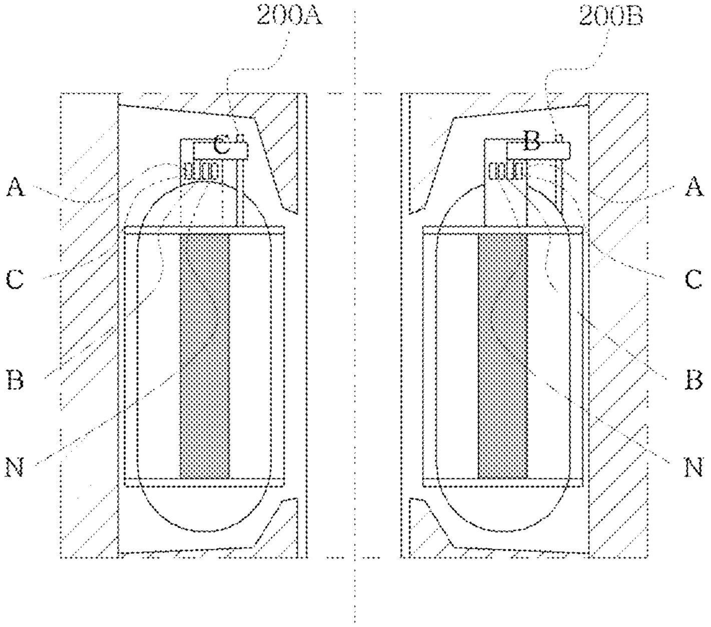
FIGS. 6 and 7 are views illustrating, in more detail, a connection structure between a coil and the busbar assembly in FIG. 5.
Figure 7:
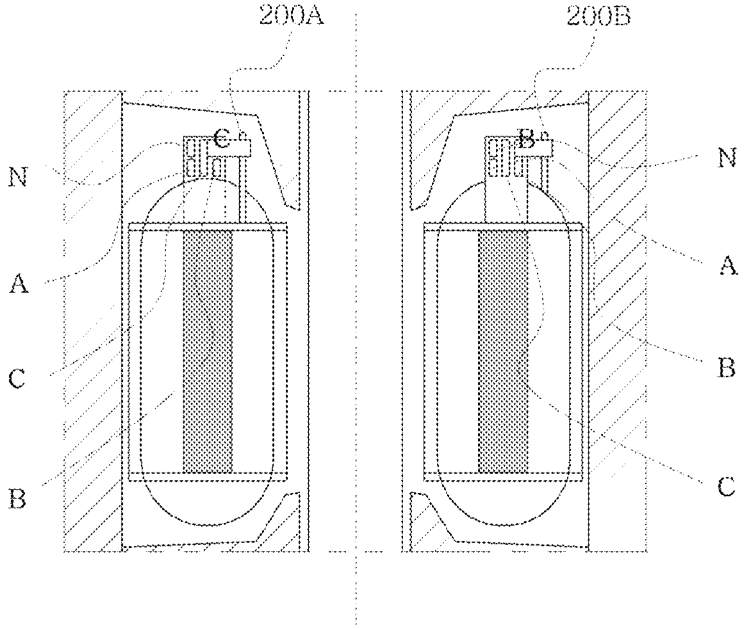

FIG. 6 and FIG. 7 are views illustrating the connection structure between the coil and the busbar assembly in FIG. 5 in more detail. Therefore, it is possible to ascertain the connection structure between the tip portion 200A or the rear end portion 200B of the coil and each of the power lines 301, i.e., the A, B, C, and N lines.

Figure 8:
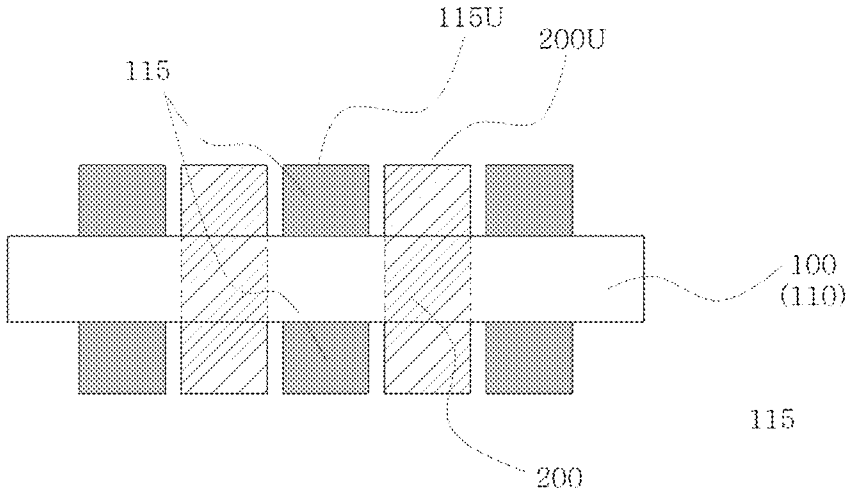
FIG. 8 is a view schematically illustrating a lateral side of the motor according to the example of the present invention.

FIG. 8 is a view schematically illustrating a lateral side of the motor according to the example of the present invention. As illustrated, the motor 10 may have a protruding portion 115 provided between the two adjacent coils 200 among the coils 200. That is, the protruding portion 115 may protrude axially from the yoke 110 positioned between the inner tooth 120A and the outer tooth 120B among the teeth 120. The protruding portion may extend toward at least one of the radially inside and the radially outside and thus further protrude from the inner tooth 120A or the outer tooth 120B.

The protruding portions may be respectively provided on the upper and lower portions of the yoke 110 or provided only on one of the upper and lower portions of the yoke 110. The protruding portion 115 may further protrude axially than the yoke 110 around which the coil 200 is wound. In addition, the protruding portion 115 may extend directly from the stator 100, i.e., the yoke 110 and the coil 200 and be integrated with the yoke 110 or the coil 200. Alternatively, the protruding portion 115 may be structured separately from the yoke 110 or the coil 200.

Because the protruding portion 115 is positioned between the two adjacent coils 200 as described above, it is possible to prevent the coil from separating from the slot to the outside and assuredly separate the two adjacent coils even when the thickness increases as the coil is wound multiple times. In addition, because the protruding portion is provided, an upper surface 200U of the wound coil and an upper surface 115U of the protruding portion may be formed on approximately the same plane. Therefore, the lower surface of the assembly body 310, i.e., the surface of the assembly body 310, which faces the yoke 110, may be formed to be flat. This may further improve the convenience of manufacturing the motor by simplifying the structure of the assembly body 310.

Figure 9:
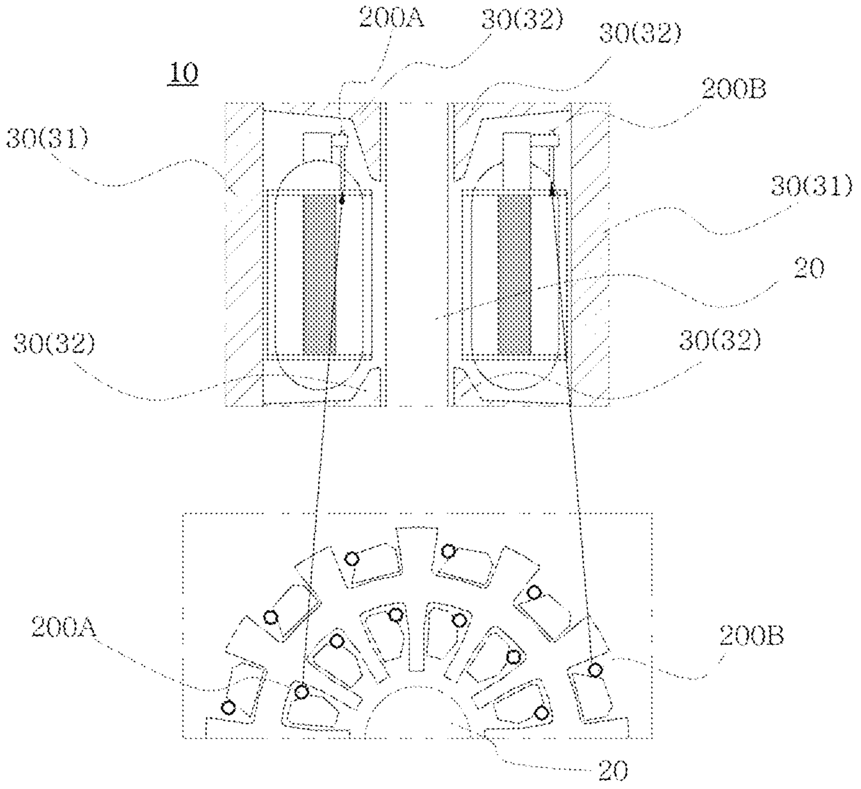
FIG. 9 is a view illustrating FIG. 5 again.

FIG. 9 is a view illustrating FIG. 5 again. As illustrated, the process of winding the coil 200 starts from the inside of the yoke 110, such that the tip portion 200A of the coil is positioned inside the yoke 110 and extends toward one side of the yoke 110 based on the axial direction, i.e., the upper portion of the yoke 110 based on the drawing. The process of winding the coil 200 ends at the outside of the yoke 110, such that the distal end portion 200B of the coil is positioned outside the yoke 110 and extends toward one side of the yoke 110 based on the axial direction, i.e., the upper portion of the yoke 110 based on the drawing. Therefore, the assembly body 310 and the yoke 110 are disposed side by side in the axial direction, and the assembly body 310 is disposed on the upper portion of the yoke 110 based on the drawing. The busbar 320 protrudes radially from the assembly body 310, such that the busbar 320 is coupled to the tip portion 200A of the coil or the distal end portion 200B of the coil.

Further, the motor may be mounted in a housing 30. For example, the housing 30 may include an outer housing 31 configured to surround an outer side of the stator, and a rotor side housing 32 configured to surround an inner side of the stator or an outer side of the rotor. In this case, in the present invention, the tip portion 200A of the coil is positioned inside the yoke 110, such that a sufficient available space is ensured between the rotor 20 and the tip portion 200A of the coil at the time of mounting the motor in the housing 30. Therefore, it is possible to advantageously ensure the insulation distance between the rotor side housing 32 and the coil 200, more specifically, the tip portion 200A that corresponds to one end of the coil.

Figure 10:
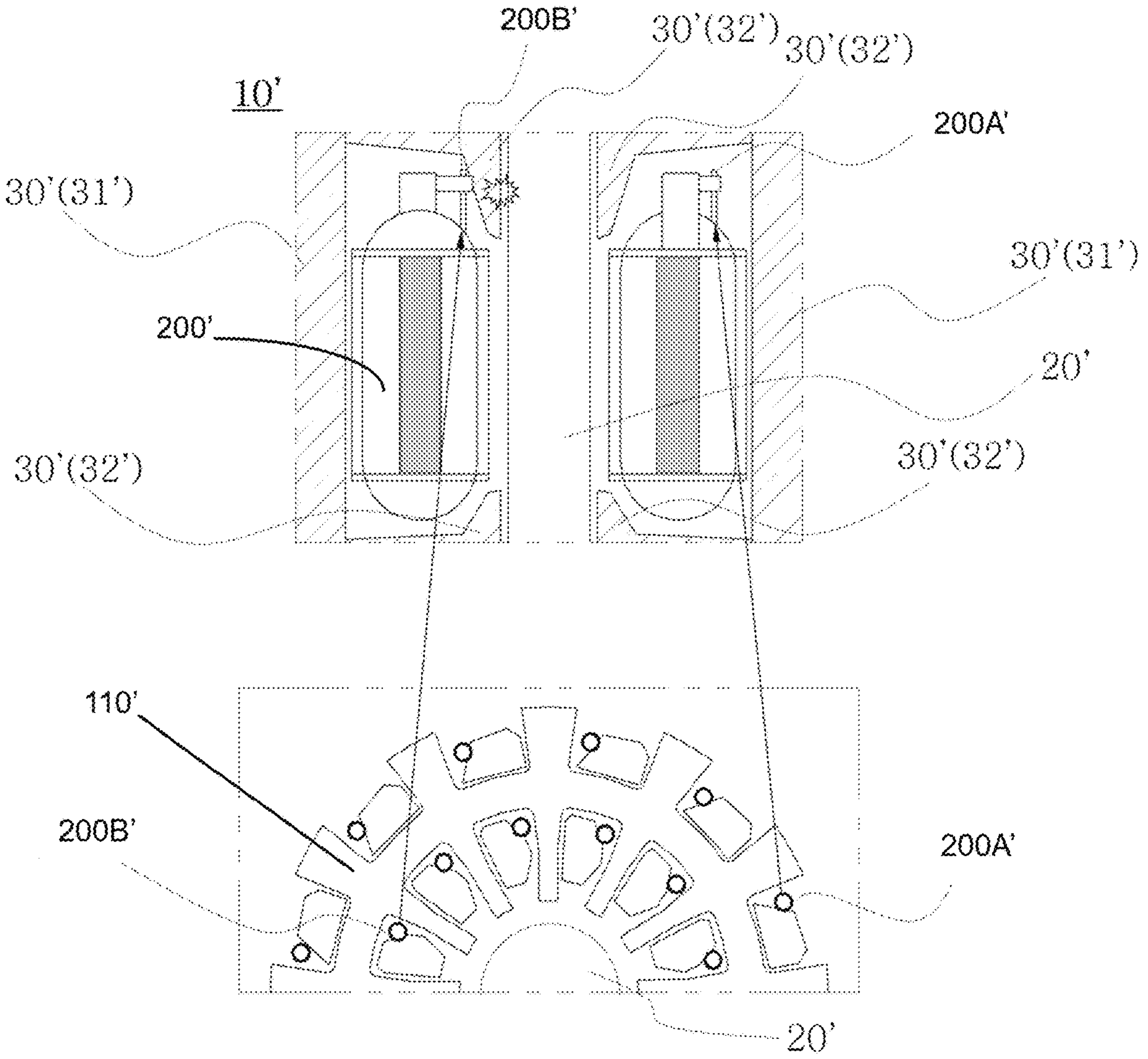
FIG. 10 is a view of a motor having a structure different from the structure of the motor according to the present invention.

FIG. 10 is a view of a motor having a structure different from the structure of the motor of the present invention. Unlike the present invention, in a motor 10' in FIG. 10, a process of winding a coil 200' starts from the outside of a yoke 110' and ends at the inside of the yoke 110'. Therefore, unlike the present invention, a tip portion 200A' of the coil is positioned outside the yoke 110', and a distal end portion 200B' of the coil is positioned inside the yoke 110'. In this case, at the time of mounting an insulation housing 30' in the motor, the rotor 20' and the distal end portion 200B' of the coil are provided adjacent to each other, there is a problem in that the interference with a rotor side housing 32' occurs or the insulation distance cannot be substantially ensured. In contrast, in the present invention, the tip portion 200A of the coil is positioned outside the yoke 110 as described above, and the tip portion 200A of the coil and the rotor 20 are maximally spaced apart from each other, which may ensure the sufficient insulation distance from the rotor side housing 32. Here, the housing 30' may include an outer housing 31' configured to surround an outer side of the stator, and a rotor side housing 32' configured to surround an inner side of the stator or an outer side of the rotor.

In addition, in the related art, the coil and the busbar are fastened to provide a structure in which the busbar covers both the inner and outer slots. In contrast, in the present invention, the busbar is disposed on the upper portion of the yoke portion, the tip portion and the distal end portion of the coil extend toward one side of the yoke based on the axial direction, i.e., the upper portion of the yoke, and then the busbar and the coil are fastened. Therefore, it is possible to easily fasten the coil and the busbar, reduce a space in a motor chamber occupied by the busbar and the end of the coil, and prevent the busbar from blocking the slot and hindering the flow of cooling air.

In addition, the positions of the tip portions of all the coils are integrated in the inner slots, which may simplify the winding facility and shorten the process time. The assembly body is formed in an annular shape and disposed in parallel with the yoke, which may allow cooling air to flow more smoothly. The busbar assembly is compactly configured, which may shorten the overall length of the motor and further simplify the overall structure of the motor.

While the embodiments of the present invention have been described with reference to the accompanying drawings, those skilled in the art will understand that the present invention may be carried out in any other specific form without changing the technical spirit or an essential feature thereof. Therefore, it should be understood that the above-described embodiments are illustrative in all aspects and do not limit the present invention.

DESCRIPTION OF REFERENCE NUMERALS

10: Toroidal motor
100: Stator
110: Yoke
115: Protruding portion
120: Teeth
130: Slot
200: Coil
200A: Tip portion of coil
200B: Distal end portion of coil
300: Busbar assembly
310: Assembly body
320: Busbar
330: Connection terminal
20: Rotor
30: Housing

What is claimed is:

1. A toroidal motor comprising:

an annular yoke;

a plurality of teeth protruding radially from the yoke and spaced apart from one another in a circumferential direction of the yoke;

coils disposed between two adjacent teeth among the plurality of teeth and wound around the yoke, a busbar assembly electrically connected to the coils, wherein a tip portion of each of the coils from which a process of winding the coil starts is positioned radially inside the yoke, wherein a distal end portion of each of the coils at which the process of winding the coil ends is positioned radially outside the yoke, wherein the tip portion of each of the coils is positioned adjacent to a radially inner surface of the yoke, the distal end portion of each of the coils is positioned to be spaced apart from a radially outer surface of the yoke, wherein the tip portion of each of the coils is positioned adjacent to any one of the two teeth positioned at two opposite sides of each of the coils, wherein the distal end portion of each of the coils is positioned adjacent to the other of the two teeth, wherein the busbar assembly comprises:

an annular assembly body; and a plurality of busbars protruding radially from the assembly body, and wherein the assembly body and the yoke are disposed side by side in an axial direction.

2. The toroidal motor of claim 1, wherein the tip portion and the distal end portion of each of the coils extend toward one side of the yoke based on an axial direction.

3. The toroidal motor of claim 1, wherein a radial width of the assembly body is equal to or smaller than a radial width of the yoke.

4. The toroidal motor of claim 1, wherein the plurality of busbars is each provided in the form of a hook and coupled to any one of the tip portion and a distal end portion of each of the coils.

5. The toroidal motor of claim 1, wherein some of the plurality of busbars protrude radially inward from the assembly body, and the remaining busbars protrude radially outward from the assembly body.

6. The toroidal motor of claim 1, wherein the busbar assembly further comprises a connection terminal connected to an external power source, and the connection terminal protrudes radially from the assembly body.

7. The toroidal motor of claim 6, wherein a through-hole is formed in a central portion of the connection terminal and formed through the connection terminal.

8. The toroidal motor of claim 1, wherein a protruding portion is provided between the two adjacent coils among the coils and further protrudes axially than a yoke portion around which each of the coils is wound.

9. The toroidal motor of claim 8, wherein a lower surface of the assembly body, which is a surface facing the yoke, is flat.

* * * * *